(12) United States Patent
VanLeer

(10) Patent No.: US 6,567,817 B1
(45) Date of Patent: May 20, 2003

(54) CACHE MANAGEMENT SYSTEM USING HASHING

(75) Inventor: Paul Wilbert VanLeer, Livingston, NJ (US)

(73) Assignee: Hewlett-Packard Development Company, L.P., Houston, TX (US)

(*) Notice: Subject to any disclaimer, the term of this patent is extended or adjusted under 35 U.S.C. 154(b) by 243 days.

(21) Appl. No.: 09/657,552

(22) Filed: Sep. 8, 2000

(51) Int. Cl.⁷ ................................................ G06F 17/30
(52) U.S. Cl. .................... 707/102; 707/100; 707/102; 707/3; 711/216
(58) Field of Search ................................ 707/100, 102, 707/3, 7, 205, 5, 6; 711/216

(56) References Cited

U.S. PATENT DOCUMENTS

| | | | | |
|---|---|---|---|---|
| 5,404,488 A | * | 4/1995 | Kerrigan et al. | 711/133 |
| 6,052,698 A | * | 4/2000 | Bennett et al. | 707/100 |
| 6,067,547 A | * | 5/2000 | Douceur | 707/102 |
| 6,226,629 B1 | * | 5/2001 | Cossock | 707/3 |
| 6,275,919 B1 | * | 8/2001 | Johnson | 711/216 |
| 6,292,795 B1 | * | 9/2001 | Peters et al. | 707/3 |
| 6,308,246 B1 | * | 10/2001 | Hagersten et al. | 711/216 |
| 6,430,670 B1 | * | 8/2002 | Bryg et al. | 711/216 |
| 2002/0004917 A1 | * | 1/2002 | Malcolm et al. | 714/4 |

OTHER PUBLICATIONS

Jerry Huck and Jim Hays, Titled "Architectural support for translation table Management in Large Address Space Machines" Copyright 1993 IEEE document #0884–7495/93, pp. 39–50.*

Stavros Christodoulakis and Daniel A. Ford, Titled "File Organizations and Access Methods for CLV Optical Disc" Copyright 1989 ACM 0–89791–321–3/89/0006/0152 pp. 152–159.*

Jerry Huck and Jim Hays, Titled "Architectural support for translation table Management in Large Address Space Machines" Copyright 1993 IEEE document #0884–7495/93, pp. 39–50.*

Stavros Christodoulakis and Daniel A. Ford, Titled "File Organizations and Access Methods for CLV Optical Disc" Copyright 1989 ACM 0–89791–321–3/89/0006/0152 pp. 152–159.*

Robert Marek and Erhard Rahm Titled "TID Hash Joins" CIKM '94–11/94 Gaitherburg MD USA □□Copyright 1994 ACM 0–89791–674–3/94/001 1. □□.*

* cited by examiner

Primary Examiner—Charles Rones
Assistant Examiner—Shireen I Solaiman

(57) ABSTRACT

In a computer system having multiple devices, such as hard disk drives, CD ROM drives, DVD drives, and like volumes in which the data is accessible in numbered blocks, an operating system maintains, for all such devices, a device buffer cache system in which 4K RAM buffers are allocated to any 4k block of device-resident data on any device that is accessed by a program. These 4K buffers are linked to the, buckets of a hash table. Indices into the hash table are computed by exclusive-ORing together the block number of a data block with a device identifier. The device identifiers are selected in such a manner that they are relatively uniformly distributed over a permissible range of values, thereby reducing the number of hash table collisions. These identifiers may be the size of the hash table multiplied by fractions in the series: 0, ½, ¼, ¾, ⅛, ⅝, ⅜, ⅞, 1/16, 3/16, and so on.

25 Claims, 6 Drawing Sheets

N = Hash Table Size

Origins = 0·X, 1/2 X N, 1/4 · N, 3/4 · N, 1/8 · N, 5/8 · N, 3/8 · N, 7/8 · N, 1/16 · N ...

CACHE MANAGEMENT SYSTEM USING HASHING

FIELD OF THE INVENTION

The present invention relates generally to data processing systems and, more particularly, to decreasing time to access data linked to hash tables.

BACKGROUND OF THE INVENTION

As processors have become faster, memory access has become a major bottleneck to overall increased performance. To improve performance, memory caching schemes have been adopted to lessen the effect of the memory access bottleneck. Direct access tables, sorted tables, and tree structured tables are conventional techniques to reduce the blockage. Also, hashing schemes are efficient in accessing stored information. Hashing schemes are useful because they provide direct access to data by mapping a large range of values into a smaller range of values. Hashing provides an efficient method of accessing stored data. Conventional hashing mechanisms utilize a data structure known as a hash table to provide access to the stored data.

One example of a conventional hashing mechanism 10 is depicted in FIG. 1. The hashing mechanism 10 comprises a key 12, a hashing function 14, a hashing index 16, and a hash table 18. The hash table 18 contains M buckets 20 numbered 0 to M−1. Each bucket 20 contains data, such as a pointer. To access the hash table 18, the key 12 is input into hashing function 14 which generates an index 16 that indicates a specific bucket 20. The hashing function 14 is a very important part of the hashing mechanism. There are two principle criteria in selecting a hashing function. The hashing function should be easy and quick to compute, and it should achieve a generally even distribution of the indices across the range of indices. Numerous hashing functions meet this criteria to some extent. For example, direct, mid-square, division-remainder, folding, digit extraction, and non-numeric key hashing all meet the above criteria. With the exception of direct hashing, none of these methods use one-to-one mapping. This means that each time a new key is hashed to indicate a bucket, a collision may occur. A collision occurs when a first key and a second key both cause the hashing function to generate the same identical index. The conventional hashing mechanisms take steps to reduce the number of collisions.

A method for resolving collisions is called chaining. As compared with linear probing and secondary hashing, this method has the advantage that it can, if necessary, accommodate more pointers than there are buckets in the table 18, though with a progressive degradation of performance as the number of pointers and keys chained to each bucket grows longer and as the linear search down such chains comes to occupy a larger fraction of the running time. Chaining requires that for each of the M buckets in the hash table, there are pointers corresponding to all of the keys that have hashed to that bucket. For example, FIG. 2 depicts a hash table 22 that is subject to collisions. The hash table 22 contains M buckets (0 to M−1), and each bucket contains two linkages. The linkages are pointers to objects 24 and 26 that contain the first and last pointers and keys placed into the corresponding bucket. If a bucket is empty, then both the first and last linkages are nil. However, when a key is hashed into a bucket 23, such as the bucket 21, the first and last linkage values are adjusted to point to an object that contains a pointer and a copy of the corresponding key. If there is a collision, and accordingly there is more than one entry in a bucket, such as the bucket 25, then the linkages are adjusted so that two objects 24 and 26, each containing a pointer and a key, are linked to the bucket 25. Bucket 21 contains a linkage to the object 23, indicating the key K3 has been hashed into the index 3 which points to that bucket. Bucket 25 is linked to the objects 24 and 26, indicating that the keys K4 and K5 have been hashed into the index 9 which points to that bucket. When a key hashes into the index value 9, the computer searches all the linked objects associated with the given bucket 25, checking the keys, to access the proper pointer. As more collisions occur and the hash buckets become more populated, the benefits of using a hash table start to diminish. The processor must serially search the objects linked to buckets to locate the correct pointer, and this increases processor time.

The hashing function itself plays a key role in reducing the number of collisions and the length of the linkages that must be searched. A hashing function that distributes the indices relatively uniformly over the hash table reduces the probability of collisions. In the prior art, typically the index values are not uniformly distributed over their respective ranges. This non-uniformity of index values has the property of increasing the probability of collisions, thereby increasing the access time and decreasing processor performance. This undesirable property of prior art hash functions is illustrated in FIG. 7. FIG. 7 shows a hash table represented as a ring 92, with the bucket 0 positioned as the uppermost entry in the ring, and with lines radiating from the perimeter of the circle representing assigned bucket linkages. The "a" indicates a relatively small distance between many nearby bucket linkages in the hash table. From the FIG. 7, it can be seen that the bucket linkages frequently tend to be bunched together and are non-uniformly distributed throughout the hash table. X, Y and Z indicate larger distances between groups of such object linkages, such that X, Y and Z are not equal. This nonuniform arrangement results in excess collisions and increased serial searching time. Therefore, the conventional hash mechanism must take further steps to reduce the number of collisions because of the non-uniformity of the hash function.

SUMMARY OF THE INVENTION

Briefly, the present invention comprises one embodiment for an operating system in a computer system. A virtual file management system for a computer, which generates an index to access data stored in hash table comprising: at least one device coupled to a processor, wherein each device has at least one memory unit which has been assigned an origin value; at least one allocated storage wherein each allocated storage corresponds to a particular device and each allocated storage has an identifier; a buffer hash table comprising a plurality of buckets wherein at least one bucket contains a linkage to a buffer cache; a program execution for generating an index into the buffer hash table using the identifier.

In a further aspect of the present invention, in an operating system for a computer system, a virtual file management system that allocates, whenever a mounted device requests a block of memory, an allocated storage area for each device, each allocated storage area having a unique identifier and each storage area containing device meta-data associated with a particular device, and where the operating system has at least one buffer hash array which links to a predetermined number of the allocated storage areas, a method for generating, for each the allocated storage area, an index into the buffer hash table by means of the linkages, to the corresponding allocated storage area, the method comprising the steps of: allocating an origin value for each mounted device, wherein the origin is a value representing a fractional value and the size of hash table, the fractional value has the property of being uniformly distributed over a range; operating on the allocated storage identifier with the origin value in order to produce the allocated storage unique identifier; generating an index into the buffer hash table, the index is computed by XOR the unique identifier with a block sequence number; and establishing a linkage to a bucket in the buffer hash table at the index location in the buffer hash table, if the bucket is having first been assigned a particular index value, or establish linkage chain to the correspondingly named bucket and to all other data structures having been assigned that same index value, if the bucket is the second or later bucket to be assigned that particular index.

In a further aspect of the present invention, the step of allocating an origin value includes using a fractional value multiplied by the size of the hash table, such that the fractional value is one of a series of values having the property of being uniform over a range of 0 to 1.

In a further aspect of the present invention, the step of allocating an origin value includes generating the series of value such that the series is a numeric series of fractional values of the form N/D, where N is one of a list of predetermined values and where D starts as 1 and is doubled each time a 1 is found in the list of values. This series has the property that it tends to be uniform over the range 0 to 1. Wherein, the fractional value is then multiplied by the size of the hash table to produce the origin value.

In a further aspect of the present invention, a virtual file management system that allocates, whenever a mounted device requests a block of memory, an allocated storage area for each device, each allocated storage area having a unique identifier and each allocated storage area containing device meta-data associated with a particular device, and where the operating system has at least one buffer hash table which links to a predetermined number of the allocated storage areas, a method for generating, for each the allocated storage area, an index into the buffer hash table by means of the linkages, to the corresponding allocated storage area, the method comprising the steps of: replacing at least a part of the identifier for each storage area with a fractional value chosen such that the set of all such fractional values chosen up to any given point in time hash the chosen fractional value relatively uniform distributed, numerically speaking, over the permissible universe of fractional values that may be chosen; thereby creating a modified identifier for each storage area; generating from the unique identifier for each storage area the index in the buffer hash table within the range of 0 to L−1, the generating function being a hashing function that generates an index whose value is within the range of 0 to L−1; and at the index location within the array, establishing a linkage to the correspondingly identified and allocated bucket, if the bucket is the first having been assigned that particular index value, or establishing a linkage chain to the correspondingly named and allocated bucket and to all other buckets having been assigned that same index value, if the bucket is the second or later bucket to be assigned that particular index; whereby, the number of buckets that are linked to the excessive number of allocated storage areas is minimized and the number of unlinked array locations is also minimized and accordingly, the time to access file meta-data is reduced. Further objects and advantages of the invention are apparent in the drawings and in the detailed description presented below. The features of novelty that characterize the invention are pointed out with particularities in the claims annexed to and forming apart of this specification.

BRIEF DESCRIPTION OF THE DRAWINGS

For a better understanding of the invention, reference will be made to the drawings wherein.

DETAILED DESCRIPTION OF THE PREFERRED EMBODIMENT

Figure 1:
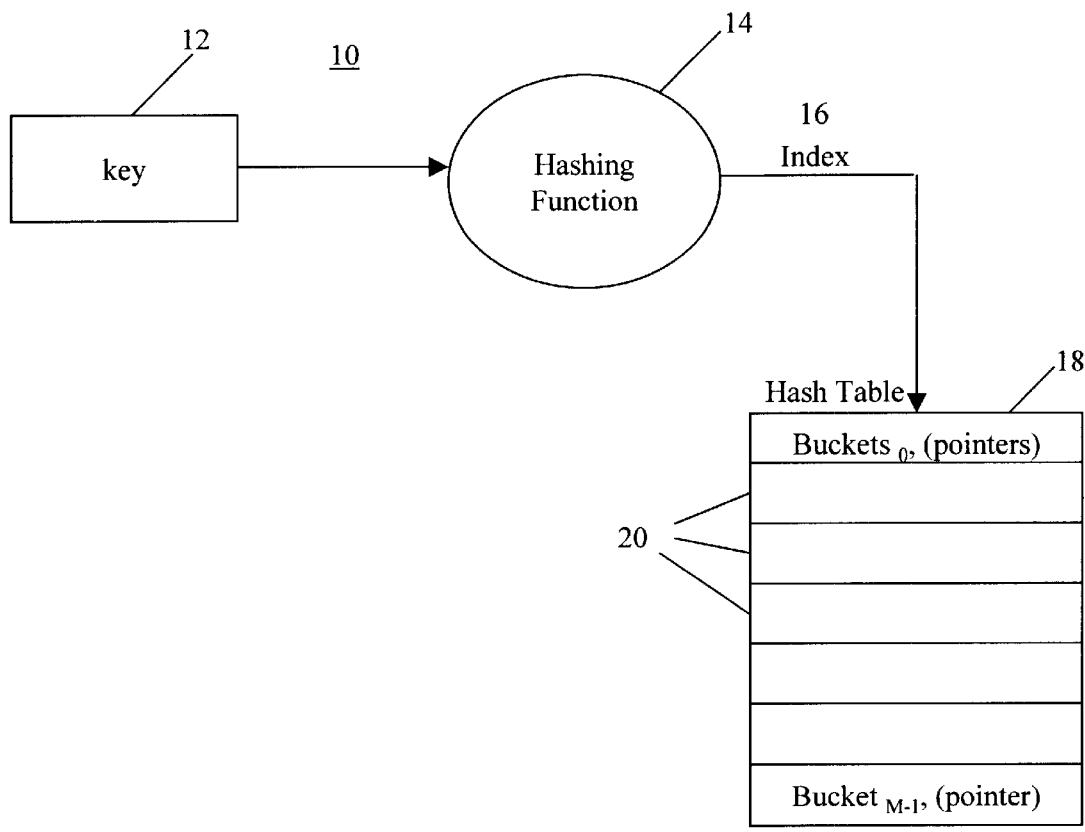
FIG. 1 is a diagrammatic representation of a conventional hashing mechanism.
Figure 2:
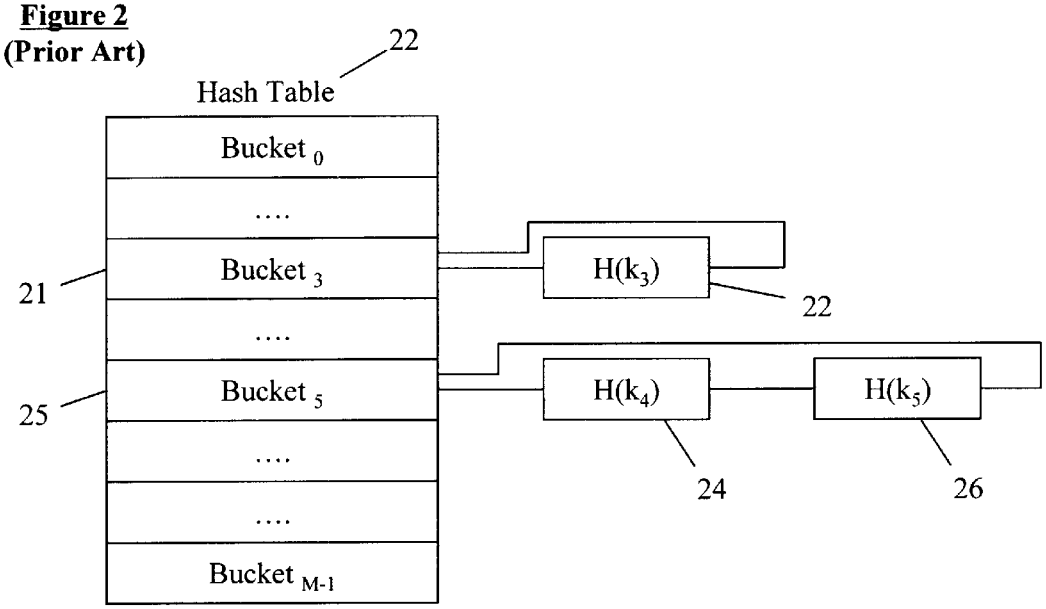
FIG. 2 is a diagrammatic representation of a hashing table that has been subject to collisions.
Figure 3:
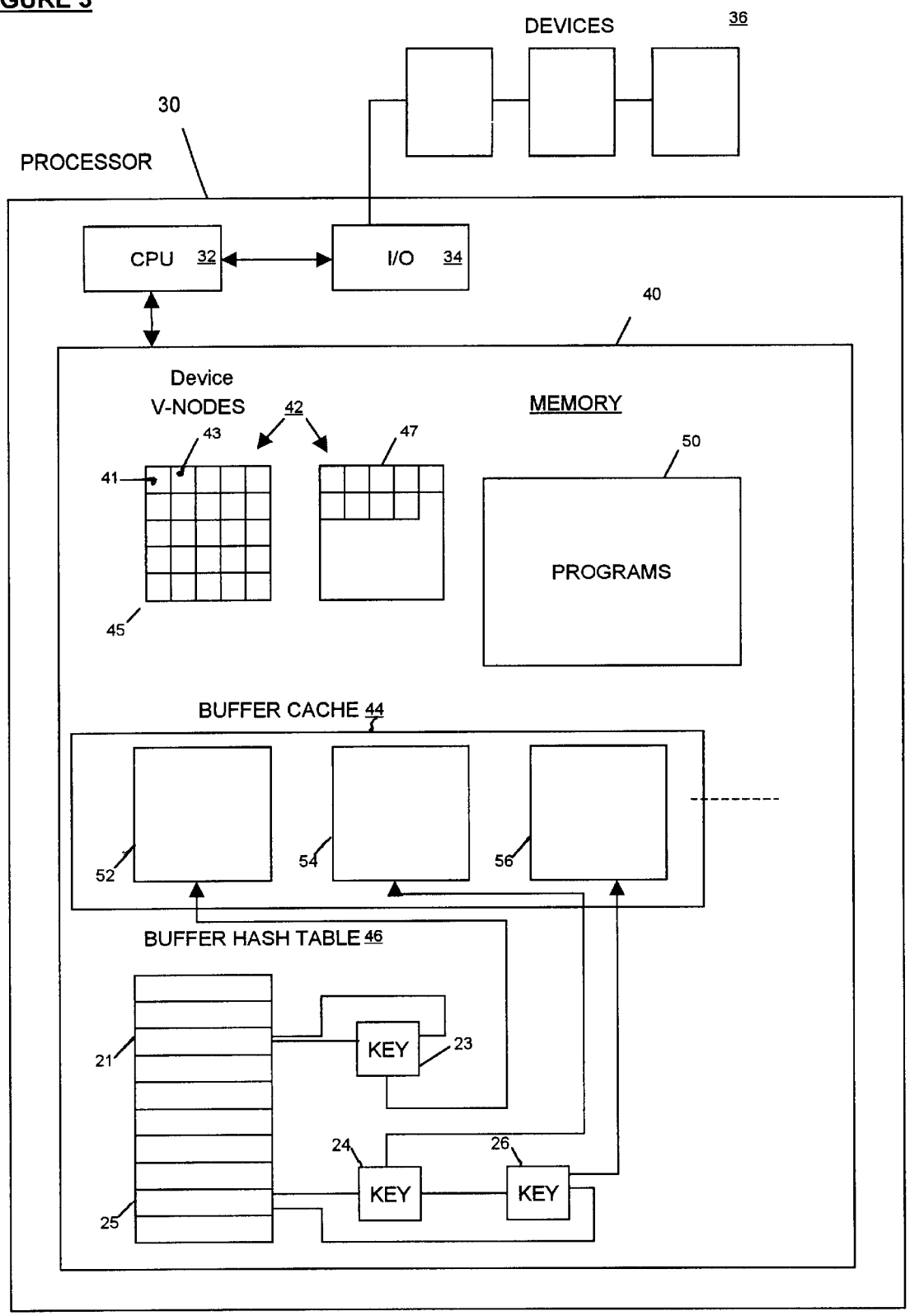
FIG. 3 is a schematic block diagram of the preferred embodiment of the invention.

FIG. 3 presents a schematic block diagram of the processor 30 designed in accordance with the present invention. The processor 30 contains a CPU 32, an Input/Output (I/O) 34 coupling the processor 30 to a predetermined number of devices 36, and a logic RAM memory device 40. The CPU 32 reads and stores data in the RAM memory 40. The RAM memory 40 contains, by way of example but not by way of limitation, two pools of device specific v-nodes 45 and 47, a Buffer cache 44 containing a plurality of data buffers 52, 54, and 56, a Buffer Hash Table 46 and a plurality of programs 50 which can be executed by the CPU 32 to perform different tasks. The pools of device v-nodes 45 and 47, a buffer hash table 46 and objects 23, 24 and 26 are linked to the buffer hash table 46 and point to the data buffers 52, 54 and 56 within the buffer cache 44. All of these data structures are part of the processor operating system in the memory 40. The programs 50 are both application programs and operating system subroutines that are run by the CPU 32 to perform specific operations (for example, hashing function). The devices 36 are typically Hard Drives, CD-Rom drives, etc. and are "mounted" by the operating system such that each device 36 and the programs 50 can communicate through operating system subroutine calls. Each "mounted" device 36 is assigned a device number (0, 1, 2, etc.) and is also allocated a 100 to 200 byte v-node 41, 43, etc. In accordance with the invention, each device is also assigned an origin value. For example, a first device may be assigned an origin value of 0, and a second device may be assigned an origin value of h/2, where h is the number of buckets in the hash table. These origin values are stored in each device's v-node. These origin values will be discussed in greater detail below.

RAM memory allocation is managed by operating system programs which an allocate and de-allocate RAM memory as needed. Because most server-class systems are designed to utilize virtual memory schemes, where RAM is typically divided up into 4K blocks that are sometimes resident in RAM and sometimes mapped out into disk storage, the programs which allocate RAM, when asked to allocate memory of a certain size, typically allocate a 4K block even when only a few hundred bytes of RAM have been requested.

Accordingly, when memory for a 100-byte v-node 41 is allocated, an entire 4K block 45 of RAM is set aside to satisfy future requests for other 100-byte blocks of RAM. This is the pool of device v-nodes noted above. Accordingly, all 100 byte v-nodes are allocated, as shown at 41 and 43, from the same 4K block 45 until the block 45 is fully allocated. Then subsequent requests for 100-byte v-nodes are satisfied from a new 4K block 47 (the second poll of device v-nodes).

The result of this allocation scheme is that the RAM addresses of the v-nodes 41, 43, etc. falling within the 4k block 45 are very close together, while the RAM addresses of the v-nodes falling within the 4K block 47 are shifted away from those in the block 45. It is customary to use these v-node RAM addresses as part of the key to the hash table 46 for the device cache, as will be explained below. The non-uniform spacing of these v-node RAM addresses is what causes the non-uniform distribution of the hash table linkages shown in FIG. 7. Thus, X1, X2, X3, and X4 in FIG. 7 may correspond to v-nodes whose RAM addresses fall within the one 4K block 45, while X5, X6, X7, and X8 may correspond to v-nodes whose RAM addresses fall within the 4K block 47, and so on.

The operating system establishes, for the devices 36, data buffers in cache 44 in RAM, each typically 4K in size, to speed up second and subsequent accesses to device-stored data. While programs 50 typically refer to data by device name and file name and by positions within a file, these references are translated by the operating system into references to specific data block sequence numbers within a specific device identified by device number.

Data buffers in cache 44 are allocated to device blocks of data whenever data are read from a device into RAM memory. These data buffers in cache 44 are allocated until no more are available, and then the first allocated is reallocated, as is well known. The buffer caches 52, 54 and 56 are pointed to by objects 23, 24, and 26 which are linked to buckets 21 and 25 in the buffer hash table 46.

The keys used to access the buffers in the cache 44 through the buffer hash table 46 have two parts; a device identifier, and a data block number. These parts are combined, or hashed together, using an exclusive-or logic function followed by truncation to provide an index into the buffer hash table 46.

A program wishing to access a file on a device calls upon the operating system, which translates this access request into a request to access a designated block of data on a designated device. The operating system XORs together the device identifier and the block number to generate a hash table index, locates the corresponding bucket, and then follows any linkage from the bucket designated by that index in searching for an object that contains the same key (device identifier and block number). If a match is found, then the pointer in the object points to a 4K RAM buffer 52, 54, etc. which contains the desired block of data. In this case, the block of data is present in RAM memory, and the device does not need to be accessed. If no key match is found, then the block of data is not present in RAM, and the operating system initiates a device read request and thereby transfers the block of data from the device into a new allocated RAM buffer.

Traditionally, the device identifier has been the RAM address of the devices v-node 41, 43, etc. This use of the v-node RAM address as part of the key, in conjunction with the memory allocation technique described above, it has been discovered is what causes the nonuniform distribution of hash table linkages shown in FIG. 7.

Figure 7:
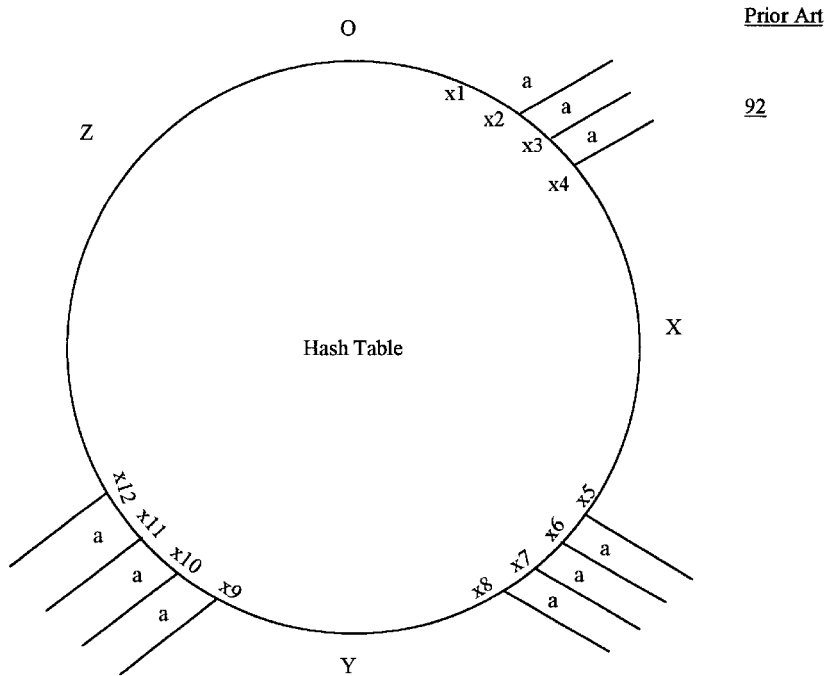
FIG. 7 is a diagrammatic representation of a hash table, represented as a ring, illustrating the non-uniformly distributed object locations, in a typical prior art systems.

For example, when the zeroth data buffer on a device is accessed, the XOR hashing function XORs zero into the RAM address of the v-node for that device, and this results in an index that is the v-node RAM address, truncated to the hash table size. This is because any value XORed against zero is unchanged. Because the v-node addresses associated with the 4K pool (block) 45 are closely spaced together but are widely separated from the v-node addresses associated with the 4K pool (block) 47, the circular table shown in FIG. 7 illustrates the actual hash table index values that are generated for the zeroth data block of each device, as was explained. When other higher-numbered data blocks are accessed, the same precise pattern results, albeit shifted around the circle from these "origin" points. This causes an excess of collisions to result.

The present invention does not use the RAM address of the v-node as a device identifier. Instead, a preassigned origin value is assigned to each device and is stored in the corresponding v-node. Unlike the RAM addresses, which are nonuniform in their distribution, these preassigned origin values are always uniformly distributed over the entire permissible range of hash table indices. In the preferred embodiment of the invention, the values assigned are the hash table size divided by integers of increasing value, as will be explained.

Figure 4A:
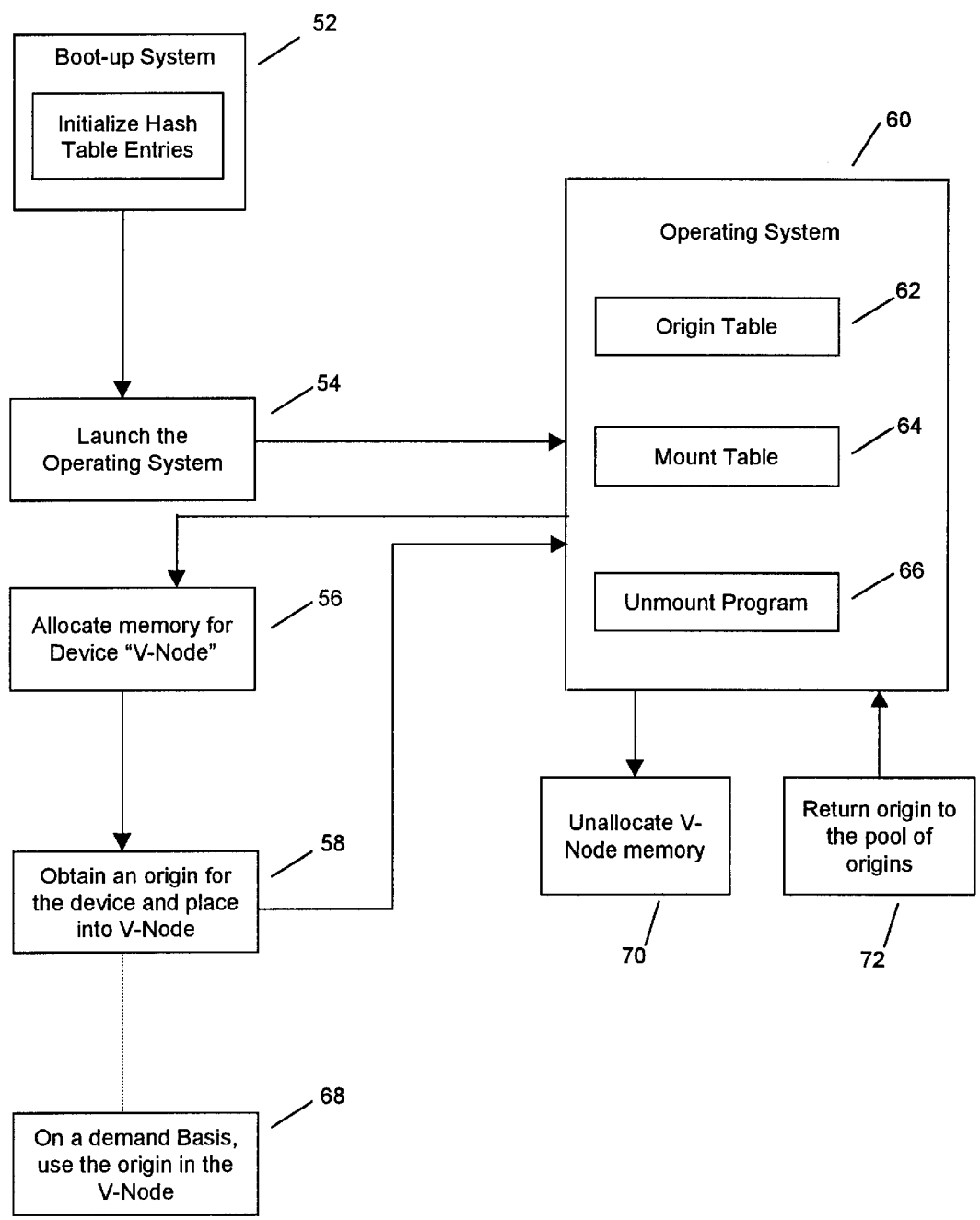
FIG. 4A is a flow chart illustrating the steps of initializing the operating system in the preferred embodiment of the invention.
Figure 4B:
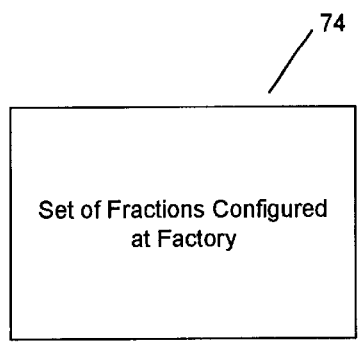
FIG. 4B is a block diagram of the fractional value table.

FIGS. 4A and 4B are flow charts illustrating the initialization steps of the preferred embodiment of the invention. FIG. 4A illustrates the boot-up, mounting, and un-mounting processes. FIG. 4B illustrates the configuration of the fractional values used to generate the origin values that are assigned to the devices Referring to FIG. 4A, in block 52, the system is "booted-up" in a manner that is well known in the art. At boot-up, the buffer hash table entries are initialized such that each bucket of the buffer hash table 46 contains two null pointers (the linkages).

At block 54, the operating system 60 is launched in a manner that is well known in the art. The operating system 60 allocates RAM for the device v-nodes and mounts the devices 36 that are coupled to the processor 30. The operating system contains an origin table 62, and a mount table 64. During the mounting process, the operating system assigns to each device 36 a unique origin value from the table 62 and a unique v-node (41, 43) from one of the 4K blocks 45, 47. The operating system accesses the origin table 62 and assigns the next available origin value to the each device 36 as that device is mounted. The origin table 62 contains pre-generated origin values which will become part of the hash table keys, as will be explained in conjunction with FIG. 6.

Figure 6:
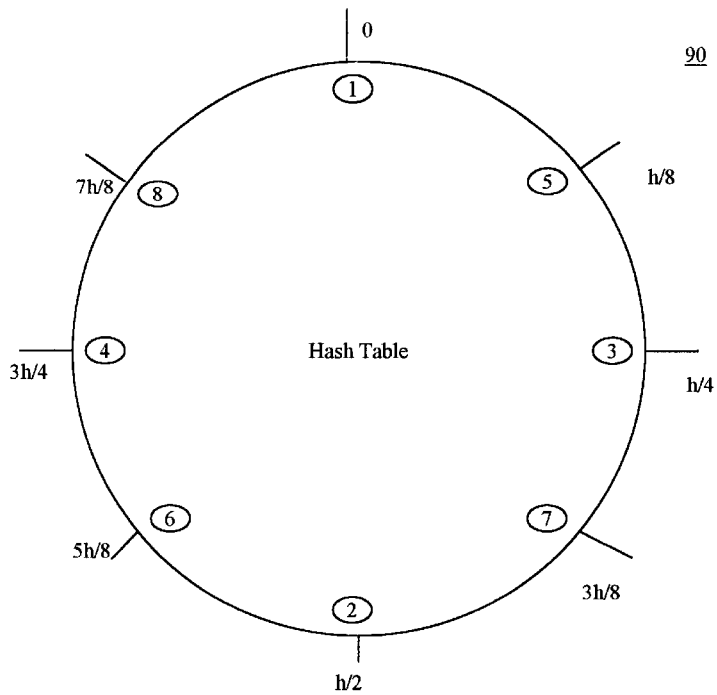
FIG. 6 is a diagrammatic representation of a hash table, represented as a ring, illustrating the uniform distribution of object locations, produced by the present invention.

FIG. 4B illustrates a block 74 that contains the origin values generated at the factory by a special program generator written in perl script, and shown in the appendix. The perl script in the appendix, generates the fractional values vfs_origin-private.h,. The fractional values are too numerous to show. The appendix also includes vfs.origin-generator.pl perl program which generates the vfs_origin-private.h. table. It is less costly to generate the values once and then store them in the origin table than to generate them at each boot-up time. However, one of ordinary skill will recognize that there are numerous ways to generate these values. In the preferred embodiment, the origin values are a numerical series of fractions of the form N/D, where N is odd and increases repeatedly until it equals D, where D starts as 1 and is doubled each time N is increased to D. Thus: 0, ½, ¼, ¾, ⅛, ⅝, ⅜, ⅞, 1/16, etc. This series has the property that it tends to be relatively uniformly distributed over the range from 0 to the size of the hash table. The fractional values are then multiplied by the size of the hash table (the number of buckets) to produce the origin values. FIG. 6 illustrates the hash table represented as a ring 90, where the top of the ring is the uppermost bucket in the buffer hash table 46 (shown in FIG. 3). This ring reveals that the origin values are relatively uniformly distributed, around the ring to minimize hash table collisions.

In FIG. 4, block 56, the operating system 60 allocates memory for the device, i.e., assigns one of the pools of device v-nodes 45 or 47 to that device, and assigns a v-node therein to the device (for example, 41 or 43). Then in block 58 an origin value is assigned to the device and value is marked as being in use in the mount table 64. The mount table 64 is adjusted to indicate which origin value is in use. Additionally, in block 58 the origin value is stored within the assigned v-node along with other device-specific information. The assigned v-node (41 or 43, for example) is normally identified by its RAM address, but for hash table lookup purposes, the device's origin value is used as part of the key instead of this RAM address, as block 68 indicates. This origin value for each device is used to compute the index into the buffer hash table 46 (shown in FIG. 3) whenever data residing on a mounted device are accessed. The mount table 64 keep track of which origin identifier is in use. The mount table 64 also records which device each origin value is assigned to.

Blocks 70 and 72 indicate the steps that are required to un-mount a device 36 from the processor 30. This is done when the processor 30 is shut down or turned off, or when a device is unmounted and then removed physically for replacement, repair or transport. Block 66 is an un-mount program. Once it is determined that a device 36 is to be un-mounted, the corresponding v-node is de-allocated in block 70, and the origin value is disassociated with the device and is returned to the pool of available origins in the mount table 64 in block 72.

Figure 5:
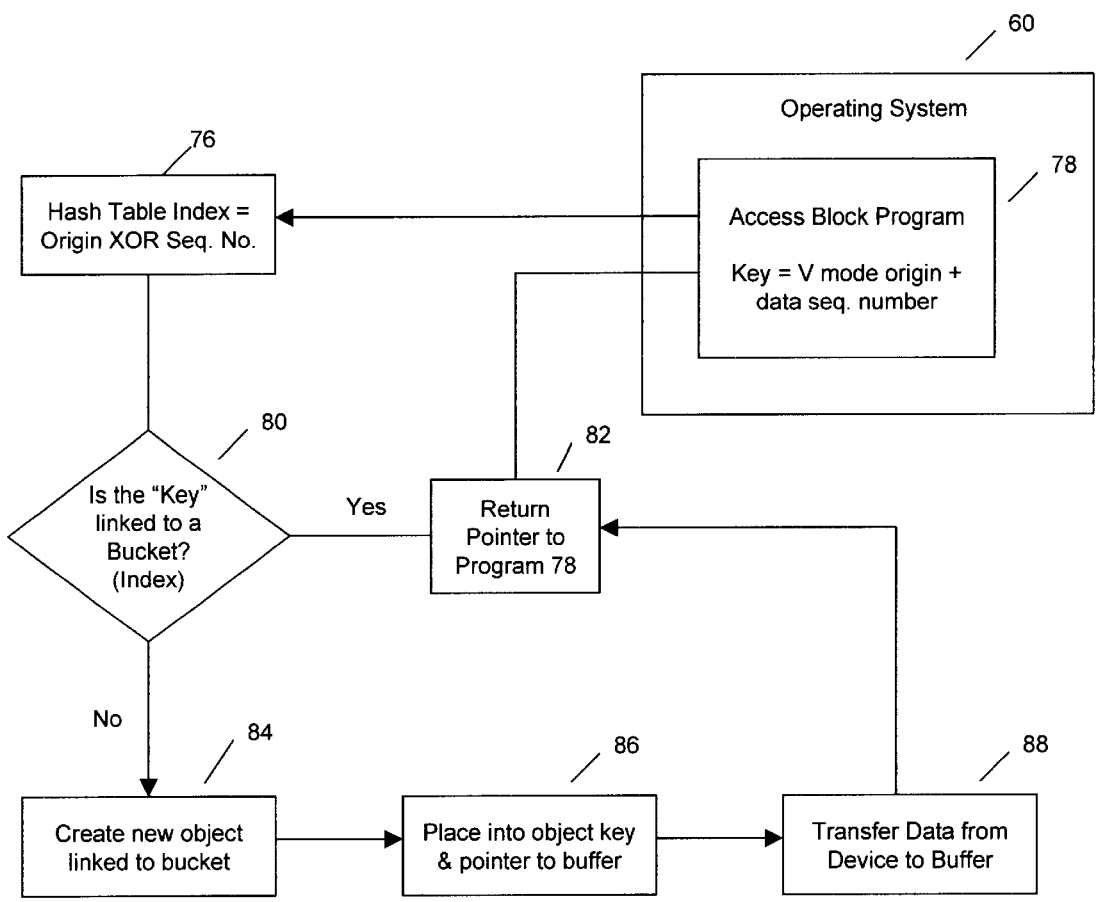
FIG. 5 is a flow-chart illustrating the steps of generating the index and creating the linkages between the buffer caches and the objects linked to the hashing table and mounting and un-mounting devices.

FIG. 5 is a flow chart illustrating the management of the RAM buffers 52, 54, 56, etc. that form the buffer cache 44 for devices, as well as the management of buffer cache linkages to the hash table 22. The flow chart shows the operating system 60 and the cache program 78 accessing a data block on a device 36. The access block program 78 is called upon by the operating system 60 when an application wishes to access data within a file on a device. Because of the properties of the buffer caches, it is not known if the data is stored in the buffer cache 44 or only on the device 36. However, the buffer hash table 46 linked objects include pointers which point to all the buffer cache 44 locations 52, 54 and 56 that actually contain stored data. Therefore, it is necessary to hash the key and generate an index into the buffer hash table 46 to find out if the desired data is present in RAM memory. The preferred embodiment of the invention uses a technique of generating an index into a hash table by applying a two-part key to a hashing function. The key has two parts—the origin stored in a device's v-node 42, as explained above; and the data block's sequence number (also referred to as a block number) of the desired data block on the device. Block 76 is the hashing function, which XORs together the two elements of the key. That value is then truncated by a masking or shifting function to produce an index into the buffer hash table 46 (shown in FIG. 3) that is of the proper size and that indicates a particular bucket 21, 25, etc. (shown in FIG. 3).

The block 80 determines whether a bucket in the buffer hash table corresponds to the key. If the index generated by hashing the key selects a bucket that is actually linked to an object containing the correct key, then at block 82 the pointer in that same object is returned to the access block program 78 as a pointer to the desired block of data which is present in RAM The bucket does point to the block of data in RAM. However, if a corresponding key is not found when the object linked to the designated bucket is searched, then the desired data block is not present in RAM, and the data block must be retrieved from the device. In this case, the operating system performs an insert object operation. A new object is created and is double-linked (in this particular embodiment, other embodiments could use a different number of linkages) to the designated bucket in block 84. This is illustrated in FIG. 3, where the objects labeled "key" are shown connected (linked) to a bucket (either bucket 21 or bucket 25) of the buffer hash table 46. The key is then placed into the object in block 86. In block 88, the block of data is transferred from the device 36 into a newly allocated 4K RAM area such as 52, 54, etc., and a pointer to this RAM area is placed into the new object. This pointer (block 82) is then returned to the access block program.

The preferred embodiment of the invention generates relatively uniformly distributed origins into the hash table 23 for each device that is mounted on the system. The origin assigned to each device has the effect of distributing the indices generated by requests for memory access to the data blocks of that device adjacent to the assigned origin. Since the origins have the property of being relatively uniformly distributed, the indices in general are also distributed so that the probability of collisions is reduced.

While illustrated within the context of a device buffer cache system, the hash table mechanisms described here may also be used in other applications, such as a virtual memory system of a codaysl-type disk access system, where the non-uniform distribution of elements of hash table keys can cause excessive collisions. Accordingly, the phrase "cache data management system" in the claims is intended to be interpreted to encompass both cache management systems and virtual memory systems. Also, while the key described above had two elements, in other applications the key may have three or more elements or just one element.

The foregoing description of a preferred embodiment of the invention has been presented for purposes of illustration and description. It is not intended to be exhaustive or to limit the invention to the precise form disclosed, and modifications and variations are possible in light of the above teachings or may be acquired for practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A cache data management system for a computer, which system generates an index to a hash table, comprising:
   at least one mountable device coupled to said computer, wherein each device is assigned an origin value that is computed to be relatively uniformly distributed;
   at least one allocated storage wherein each allocated storage corresponds to a data block for a particular device and has a data block identifier;
   a hash table comprising a plurality of buckets wherein at least one bucket is linked to at least one of the allocated storage; and a program for generating an index into said hash table from at least said origin value and a data block identifier.

2. The system of claim 1, wherein said preassigned origin value is computed from a fractional value and from the hash table size.

3. The system of claim 2, wherein said fractional value is one of a numerical series of fractions of the form N/D, where N is taken from a predetermined roster and where D starts as 1 and is doubled each time a 1 is found in said roster, wherein said series has the property that any subset of the series including the first value in the series is relatively uniform over the range 0 to 1, and said fractional value is multiplied by the size of said hash table to produce said origin value.

4. The system of claim 1, wherein a hash function program execution generates said index into said hash table by performing an XOR operation on said origin value associated with said device and said data block identifier.

5. The system of claim 4, wherein said hash function program execution generates said index into said hash table by truncating the output of said XOR operation to produce said index of a predetermined size.

6. The system of claim 1, wherein said allocated storage is a multiple of the size of a virtual memory block of said computer.

7. The system of claim 1, wherein said hash table includes a plurality of buckets in which each bucket includes at least one linkage, at least one of said bucket linkages linking to said allocated storage.

8. The system of claim 7, further comprising at least one object which is linked to a particular bucket and wherein the object includes a key and provides a pointer to the allocated storage.

9. The system of claim 8, wherein the key includes said at least said origin value and said data block identifier.

10. The system of claim 9, wherein said origin value is associated with a corresponding device v-node storage in a memory.

11. In the data management portion of an operating system for a computer, a method to generate an index to access data associated with a hash table comprising the steps of:

assigning origin values to source data from a plurality of mountable sources, said origin values being relatively uniformly distributed;

assigning at least one allocated storage to at least one of said origin values in response to a request to access a block of said source data, such that the origin value and a data block identification value are associated with the allocated storage as parts of a key; and using said key to determine an index into said hash table, and forming a linkage between the allocated storage and the table entry identified by the index that can be used to access data in the allocated storage.

12. The method of claim 11, wherein the step of assigning an origin value includes generating said origin value such that said origin value is a fractional value scaled up to the size of said hash table.

13. The method of claim 12, wherein the step of assigning said allocated storage includes:

generating said fractional value by providing a numerical series of fractions of the form N/D, where N is taken from a predetermined roster and where D starts as 1 and is doubled each time a 1 is found in the list of roster values, wherein said series has the property that any sequence of said series starting with the first sequence fraction is relatively uniformly spread over the range of 0 to 1, and where said fractional value is multiplied by the size of the hash table to produce said origin value, said multiplication occurring either before or after the division in the fraction.

14. The method of claim 11, wherein said step of generating an index comprises:

generating said index into said hash table by performing an XOR operation on at least said origin value associated with said allocated storage and said identification value.

15. The method of claim 14, wherein said step of generating an index further comprises:

truncating the output of the XOR operation to produce an index of a predetermined size.

16. The method of claim 11, wherein said step of allocating includes indicating that the allocated storage is a block of memory the size of a virtual memory page or some multiple thereof.

17. In an operating system for a computer system, a cache data management system that allocates, whenever a program requests access to a block of data on a mounted device, an allocated storage area for each such block, where each device is assigned a unique identifier and a storage area containing device specific data, and where the operating system has at least one hash table which contains links to said allocated storage areas, a method for generating, for each said allocated storage area, an index into the buffer hash table that designates buckets which are linked to the corresponding allocated storage areas, the method comprising the steps of:

allocating an origin value to each mounted device, wherein the origin is a value computed from a fractional value and the size of the hash table, wherein said fractional values have the property of being relatively uniformly distributed over a range of values;

generating an index into said buffer hash table, the index computed by XORing said origin value with a device data block identifier; and establishing a linkage between an allocated storage area and a bucket in said buffer hash table at the indexed location in the hash table if a bucket has not previously linked, or been establishing a linkage chain between the linked bucket at the indexed location and all the allocated storage areas having been assigned that same index value, if a bucket has been previously linked.

18. A method of claim 17, wherein the step of allocating said origin value includes using a fractional value multiplied by the size of said buffer hash table, either by multiplying the numerator by said size or by multiplying the computed fractional value by said size, such that the fractional value is one of a series of values having the property that sequence of said series, including being relatively uniformly distributed over a range of 0 to 1.

19. A method of claim 18, wherein said step of allocating an origin value includes generating a series of values such that the series is a numeric series of fractional values of the form N/D, where N is taken from a predetermined roster and where D starts as 1 and is doubled each time a 1 is found in the list of values, wherein said fractional value is then multiplied by the size of the hash table to produce the origin value, said multiplication occurring either after the division or before the division.

20. A method of claim 19, wherein said step of generating an index further comprises truncating the outcome of said XOR operation and generating an index having a maximum value equal to the size of said hash table.

21. A virtual file management system that allocates, whenever a program requests data from a device for the first time, an allocated storage area for each data block of each device, each device data block having a unique key, and where the operating system has at least one buffer hash table which links to said allocated storage areas, a method for generating, from the key for each data block, an index into the buffer hash table as a way of accessing the corresponding allocated storage area, the method comprising the steps of:

assigning at least a part of said key for each storage area with a value chosen such that the set of all such values chosen up to any given point in time are relatively uniformly distributed, thereby creating a unique identifier for each storage area;

generating from said unique identifier for each storage area an index to the buffer hash table within the range of 0 to L−1, where L is the size of the hash table; and at the index bucket within the hash table, establishing a linkage to the correspondingly identified and allocated storage area, if the index value is the first having been assigned that particular bucket, or establishing a linkage chain between the bucket and the correspondingly named and allocated storage area and to all other storage areas having been assigned that same index value, if the storage area is the second or later to be assigned that particular index;

whereby the number of buckets that are linked to an excessive number of allocated storage areas is minimized and the number of unlinked buckets is maximized, and accordingly the time to access each block of data is reduced.

22. The method of claim 21, wherein said step of replacing at least a part of said key includes replacing a portion of the key with a multiple of a fractional value, where said fractional values have the property of being relatively uniformly distributed over a range of 0 to 1.

23. The method of claim 21, wherein the step of choosing a value further comprises:

selecting values from a fractional series wherein the fractional series is of the form N/D where N is taken from a predetermined roster and D starts as 1 and is doubled each time a 1 is found in the roster.

24. The method of claim 23, wherein the step of generating an index includes:

performing an XOR operation on the chosen value and a data sequence number.

25. The method of claim 24, wherein the step of generating an index further comprises:

truncating the output of the XOR operation such that the index is within a predetermined range such that the index corresponds to a bucket in the hash table.

* * * * *